(No Model.)
L. LANDRETH.
DECORTICATING MACHINE FOR RAMIE, &c.
No. 426,453. Patented Apr. 29, 1890.
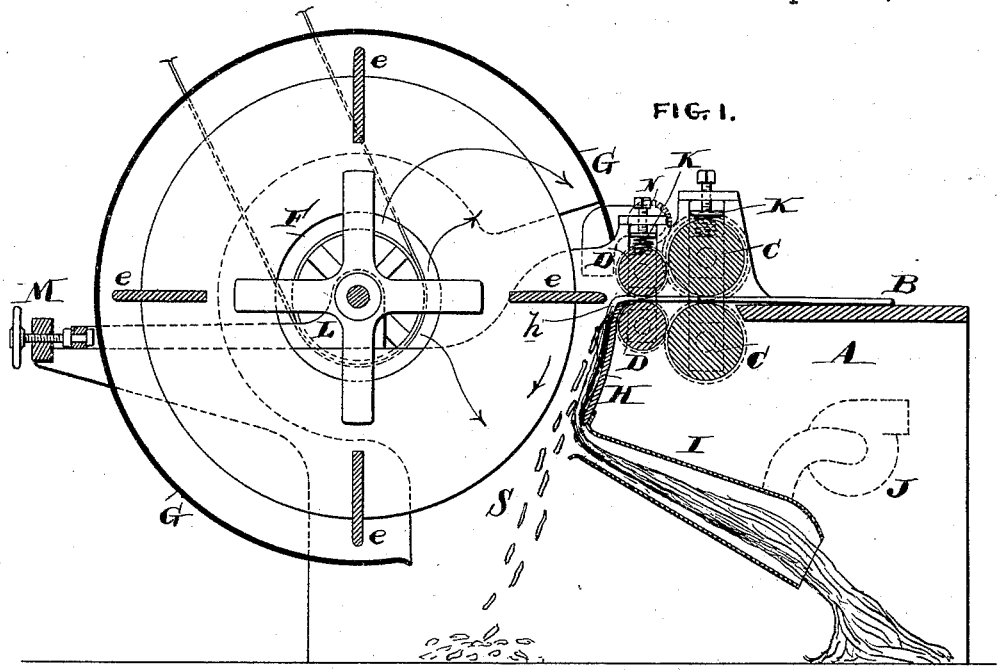
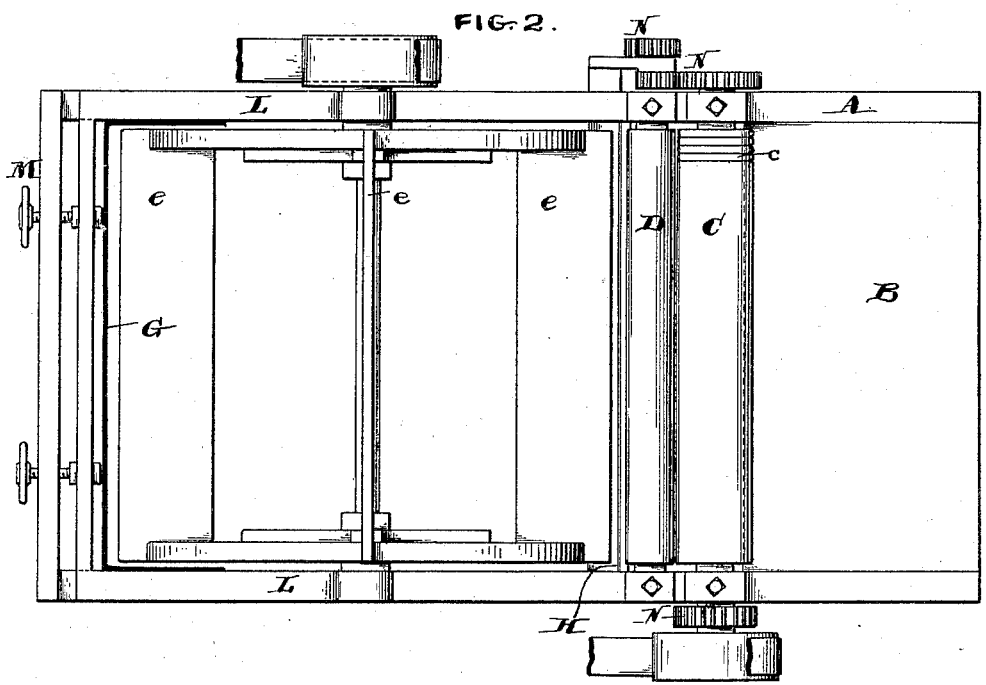
WITNESSES:
INVENTOR:
Leopold Landreth
By his atty

UNITED STATES PATENT OFFICE.

LEOPOLD LANDRETH, OF BRISTOL, PENNSYLVANIA.

DECORTICATING-MACHINE FOR RAMIE, &c.

SPECIFICATION forming part of Letters Patent No. 426,453, dated April 29, 1890.

Application filed September 28, 1889. Serial No. 325,425. (No model.)

*To all whom it may concern:*

Be it known that I, LEOPOLD LANDRETH, of Bristol, in the county of Bucks and State of Pennsylvania, have invented an Improvement in Decorticating-Machines for Ramie, &c., of which the following is a specification.

My invention has reference to decorticating-machines for ramie and other fibrous plants; and it consists of certain improvements, which are fully set forth in the following specification, and shown in the accompanying drawings, which form a part thereof.

The object of my invention is to produce a machine which shall be adapted to treat the stalks of ramie, jute, flax, or other similar plants in an expeditious manner for the purpose of separating the woody interior from the bark or vegetable fiber which incloses the said woody interior.

My invention is especially useful in those plants where there is a large amount of gum contained with the fiber, and which gum has made it difficult to work the plant in machines as heretofore constructed.

In carrying out my invention I break down the plant by passing it between rollers, which reduce it to a flattened condition, and as it projects beyond the said rollers it is beaten continuously in one direction by means of a rapidly-rotating beater-fan, the blades of which perform the function of beating out the broken woody substances of the plant, leaving the fibrous bark intact. The bark is fed over the edge of a curved abutment arranged at such a distance from the beaters as to insure the latter removing every particle of the woody substance without cutting the fibrous bark. The beaters are so formed that they act as a fan and cause strong currents to be blown against the fiber as it passes through the machine, thereby forcing it to travel against the abutment. The air-current also causes the bark of the decorticated plant to enter a passage-way for the purpose of separating the fiber from the woody substances, which are discharged beyond the said passage-way.

In the drawings, Figure 1 is a sectional side elevation of a machine embodying my invention, and Fig. 2 is a plan view of the same.

A is the main frame of the machine.

B is the feed-table, from which the ramie or other plant is fed between the rollers C C. These rollers may be made smooth or slightly roughened or grooved circumferentially upon their surface, and are preferably of large diameter, so as to be able to grasp the ramie and feed it forward. After being fed forward the ramie is received between two rolls D D and by them caused to project out over the abutment H, where it is struck by the blades *e* of the rapidly-revolving beater-fan E.

The rolls D are made small, so that the ramie may be held close to the end of the abutment. It would be objectionable to use small rollers alone, on account of the difficulty which is experienced in feeding large stalks to rollers having small diameters; but by the combination of the two rolls here shown the various difficulties are overcome. These several rollers are geared together by gearing N, so as to revolve at the same surface speed. The upper rolls are supported by spring-pressed bearings K, whereby they may automatically adjust themselves to different thicknesses of ramie which may pass between them, or where a thick portion of ramie is fed to one end of the roll and a thin portion to the other end, and under which condition the roll will tilt slightly.

The upper edge of the abutment H is made rounded and so as to meet the lower roll D, and as the ramie is projected out over the abutment the beaters *e* strike it, bending it over this rounded edge *h* and at the same time beat out the woody substances. The curved face of the abutment H is substantially concentric with the travel of the beaters *e*, and the parts are so relatively arranged that there is always a space between the abutment-surface and the outer edges of the beaters, in which the fibrous bark may pass after having been broken over the edge *h*.

The beater-fan E is made with an open center F, two heads, and a series of radial beater-arms *e*, and is rotated at a high velocity, and acts as a fan in sucking in the air at the open center F and forcing it out by centrifugal force due to the action of the beaters. To direct the currents of air in the proper direction, a hood G may be employed and so shaped as to cover all parts of the beater-fan except those directed toward the rolls, the abutment, and the discharge-opening. The outer edges of the beaters e are made rounded, so as to avoid cutting the bark of the ramie.

The beater-fan E is supported in a frame L and made adjustable to or from the abutment H and rolls D by a suitable screw device M.

The woody substance of the ramie is delivered by the force of the beaters out of the opening S at the bottom of the machine, while the flexible stringy fibrous bark is driven through the passage-way I at the foot of the abutment H by the force of the blast due to the action of the beater, and is thus separated from the woody substance. The draft through the passage-way I may be increased, if desired, by a suitable suction-fan J. (Shown in dotted lines.)

I do not limit myself to the minor details of construction, as they may be modified in various ways without departing from the spirit of the invention.

Having now described my invention, what I claim as new, and desire to secure by Letters Patent, is—

1. The combination of an abutment, feeding devices to feed the fibrous plant over the edge of said abutment, a discharge passage-way for the fiber leading from said abutment, suction devices opening from said passage-way to create a draft therein, a rapidly-moving beater moved across the edge of the abutment, and a hood enveloping said beater.

2. The combination of an abutment, feeding devices for feeding the fibrous plant over the edge of said abutment, a rapidly-rotating beater having blades which are moved in rapid succession across the space in front of the edge of the abutment, but without touching it, and adjusting mechanism to adjust the rotating beater to or from the abutment.

3. The combination of an abutment, a pair of large feed-rolls, a pair of small crushing and feed rolls arranged close to the abutment, and a rapidly-rotating beater to break the fibrous plant as it is fed over the abutment by the feed-rolls.

4. The combination of an abutment, a pair of large feed-rolls, a pair of small crushing and feed rolls arranged close to the abutment, elastic bearings for said rolls, and a rapidly-rotating beater to break the fibrous plant as it is fed over the abutment by the feed-rolls.

5. The combination of an abutment, a pair of large feed-rolls, a pair of small crushing and feed rolls arranged close to the abutment, and a rapidly-rotating beater-fan to break the fibrous plant as it is fed over the abutment by the feed-rolls, and a delivery chute or passage-way opening from the base of the abutment.

6. The combination of feeding-rolls, a curved abutment in the rear of the feed-rolls, over which the ramie or other plant is to be broken, a rapidly-rotating beater arranged to rotate close to the abutment, but without contact therewith, and a discharging passage-way for the fiber opening from the abutment.

7. The combination of feeding-rolls, a curved abutment in the rear of the feed-rolls, over which the ramie or other plant is to be broken, a rapidly-rotating beater arranged to rotate close to the abutment, but without contact therewith, a discharging passage-way for the fiber opening from the abutment, and an exhaust-fan operating to create a draft through the passage-way.

In testimony of which invention I have hereunto set my hand.

LEOPOLD LANDRETH.

Witnesses:
ERNEST HOWARD HUNTER,
C. S. CHAMPION.